United States Patent Office 3,832,333
Patented Aug. 27, 1974

3,832,333
LACTONE REACTION PRODUCTS
Wen-Hsuan Chang, Gibsonia, and Roger L. Scriven, Pittsburgh, Pa., assignors to PPG Industries, Inc., Pittsburgh, Pa.
No Drawing. Filed Oct. 16, 1973, Ser. No. 407,017
Int. Cl. C08g 22/00
U.S. Cl. 260—77.5 C                    11 Claims

ABSTRACT OF THE DISCLOSURE

Novel lactone reaction products are obtained by reacting a lactone with urea or a polyureido compound. These reaction products are useful in elastomeric coating formulations and in high-solids coating formulations.

BACKGROUND OF THE INVENTION

The reactions of lactones with compounds containing groups with active hydrogen atoms (e.g., —OH, —NH$_2$, or —COOH) to produce lactone polyesters are well documented in the art (see, e.g., U.S. Pats. Nos. 3,169,945 and 3,186,971). Such lactone polyesters have generally found utility as plasticizers and as intermediates for preparing urethane elastomers, foams and resins. While the lactone polyesters generally possess many desirable properties, coating formulations based thereon sometimes are characterized by inadequate film adhesion, inadequate film properties, low cohesive energy (thus being dissolvable in weak solvents), and high cost.

SUMMARY OF THE INVENTION

Novel substitutes for lactone polyesters have now been found which when incorporated in coating formulations greatly improve the overall properties of such coatings. The novel products of this invention broadly comprise the reaction product of a lactone and urea or a polyureido compound. Coatings in which such lactone reaction products are included are characterized by increased adhesion, improved film properties and decreased cost.

The compositions of the instant invention comprise the reaction product of (A) a lactone of the formula:

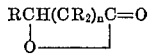

wherein $n$ is an integer of from four to six, at least $n+2$ groups represented by R are hydrogen and the remaining R groups are hydrogen, alkyl, cycloalkyl, alkoxy and/or single ring aromatic hydrocarbon radicals, and (b) a compound of the formula:

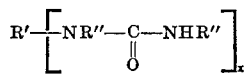

wherein R" is selected from the group consisting of hydrogen or lower alkyl of from 1 to 4 carbon atoms, and $x$ is an integer of from one to three. R' is hydrogen or a monovalent organic radical when $x$ is one, R' is a divalent organic radical when $x$ is two, and R' is a trivalent organic radical when $x$ is three. The organic radical defined in the above formula as R' is not critical; rather, the important and critical factor is the presence of the ureido group or groups. In one preferred embodiment, the reactants are epsilon-caprolactone and urea.

DETAILED DESCRIPTION OF THE INVENTION

The compositions of the instant invention contain as one reactant a lactone. This lactone is reacted with urea or a polyureido compound to produce the compositions of this invention.

The lactone used as a starting material may be any lactone or combination of lactones having between six and eight carbon atoms in the ring, and having at least one hydrogen substituted on the carbon atom which is attached to the oxygroup in the ring. The lactone used as a starting material can be represented by the formula:

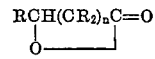

in which $n$ is an integer between four and six, at least $n+2$ R's are hydrogen, and the remaining R's are of the groups consisting of hydrogen, alkyl, cycloalkyl, alkoxy and single ring aromatic hydrocarbon radicals. The preferred lactones are the epsilon-caprolactones, i.e., where $n$ in the above formula is four. In general, none of the substituents on the lactone ring should contain more than about twelve carbon atoms, and the total number of carbon atoms in the substituents on the lactone ring should not exceed about twelve.

The lactones, including the epsilon-caprolactones, usable in the instant invention are known in the art, and are more completely described in U.S. Pats. Nos. 3,169,945 and 3,186,971.

The above-described lactones are reacted with urea or a polyureido compound to produce the novel compositions of this invention. The compound to be reacted with the lactone can be represented by the formula:

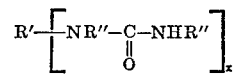

wherein R" is selected from the group consisting of hydrogen or lower alkyl of from 1 to 4 carbon atoms, and $x$ is an integer of from one to three. R' is hydrogen or a monovalent organic radical when $x$ is one, R' is a divalent organic radical when $x$ is two, and R' is a trivalent organic radical when $x$ is three. Again, the particular organic radical defined in the above formula by R' is not critical.

The ureido compounds useful in this invention can be produced by a variety of different methods. For example, useful compounds can be produced by reacting ammonia with a monoisocyanate, a diisocyanate, a triisocyanate, or a polymer containing isocyanate groups. Alternatively, useful products can be produced by reacting urea with a monoamine, a diamine, a triamine, or a polymer containing amine groups.

Thus, R' can be essentially any monovalent, divalent or trivalent organic radical, i.e., acyclic, aromatic, alicyclic, acyclic substituted aromatic, aromatic substituted acyclic, heterocyclic. For example, when $x$ in the above formula is one, R' can be hydrogen or essentially any monovalent organic radical including alkyl, such as methyl, ethyl, propyl, and the like; aryl (including both alkaryl and aralkyl), such as phenyl, methylphenyl, benzyl, diphenyl and the like; and cycloalkyl, such as cyclohexyl and the like. When $x$ is two in the above formula, R' can be essentially any divalent organic radical which can link together the two ureido groups, including alkylene such as methylene, ethylene, propylene, tetramethylene, hexamethylene, trimethylhexylene and the like; arylene (including both alkarylene and aralkylene) such as phenylene, methylphenylene, benzylene, diphenylene, toluene, dimethylbiphenylene, methylenebisphenyl, dimethylmethylenebisphenylene, and the like; alkenylene (including alkenylarylenes), such as vinylene, 3 - butenylene-1,4-, linolylene; cycloalkenylenes, such as cyclopentenylene, alkenylarylenes such as vinylphenylene and the like; and cycloalkylenes such as methylcyclohexylene, cyclopentylene and the like. In a like manner, when $x$ is three, R' can be essentially any trivalent organic radical which can link together the three ureido groups, including trivalent acyclic, alicyclic, aromatic, acyclic substituted aromatic, aromatic substituted acyclic and heterocyclic. Additionally, the organic radicals may be substituted with such groups as carbonyl, cyano, halo, amino, hydroxy, alkoxy, carboxy, nitrile and the like. Again, it is emphasized that the particular organic radical chosen is not critical; rather, the critical factor is the presence of the ureido group or groups.

The lactone and the urea or the polyureido compound can be blended in widely varied proportions to provide the novel compositions of this invention. In general, however, the reactants are either blended in equimolar amounts, or blended with a molar excess of the lactone component. It is preferred that the molar ratio of lactone to urea be at least 4:1 and preferably 10:1. Once the materials are blended, heat is necessary to initiate the reaction. Generally, temperatures between about 100° C. and 250° C. are required, with a preferred reaction temperature being about 130° C. If the starting materials are highly crystalled, higher reaction temperatures are generally required, although the temperature ordinarily should not exceed about 250° C. If desired, a catalyst may be used. Suitable catalysts include tetrabutyl titanate, stannous octanoate, and zinc chloride.

The reaction products of the instant invention have many varied uses. The reaction products can be combined with an aminoplast resin or with a blocked polyisocyanate to provide a useful high solids coating formulation. Preferably, however, the reaction products of the instant invention can be used to produce elastomeric coatings.

Recent developments in the area of elastomeric coatings have produced compositions having a broad variety of useful properties. These compositions broadly comprise (1) a hydroxyl-containing urethane reaction product of an organic polyisocyanate and a polyhydric material, and (2) an aminoplast resin. In some instances, a polymeric polyol is included in the composition to enhance the overall properties thereof. These elastomeric compositions are storage stable in one package, and when cured, form coatings which are adherent, durable and highly extensible. The specific elastomeric coating compositions in which the reaction products of the instant invention may be used are described and claimed in Application Ser. Nos. 828,337, filed May 27, 1967, now abandoned; 839,648, filed July 7, 1969; 347,022 filed Apr. 2, 1973; 361,010, filed May 16, 1973; 361,011, filed May 16, 1973; and 361,015, filed May 16, 1973. Generally, the reaction products of the instant invention may be substituted for all or part of the polyhydric material or for all or part of the polymeric polyol. In addition, where a polyester polyol is used as part or all of the polyhydric material, the reaction products of the instant invention may be substituted for all or part of the glycol substituent used to produce the polyester polyol.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE 1

A reactor was charged with the following materials:

Parts by weight
ε-Caprolactone _____ 57
Urea _____ 30

The mixture was heated and stirred until homogeneous and was then heated at 350° F. for about 22 hours. Gel permeation chromatography (GPC) analysis showed that all the caprolactone and urea had reacted.

EXAMPLE 2

A reactor was charged with the following materials:

Parts by weight
ε-Caprolactone _____ 228
Urea _____ 24

The mixture was heated and stirred until homogeneous and was then heated at 350° F. for about 22 hours. GPC analysis showed that all the caprolactone and urea had reacted.

The resultant product was characterized by a Gardner-Holdt viscosity of D at 85 percent solids in methylbutyl ketone.

EXAMPLE 3

The following materials were charged to a reactor:

Parts by weight
ε-Caprolactone _____ 114
Urea _____ 6
Tetrapropyl titanate, 6 drops.

The mixture was heated and stirred until homogeneous and was then heated at 300° F. for 19 hours. GPC analysis showed that all the caprolactone and urea had reacted.

The resultant product was characterized by a Gardner-Holdt viscosity of G at 70 percent solids in methylbutyl ketone.

EXAMPLE 4

The following materials were charged to a reactor:

Parts by weight
ε-Caprolactone _____ 171
Urea _____ 3
Tetrapropyl titanate, 6 drops.

The mixture was heated and stirred until homogeneous and was then heated at 300° F. for 19 hours. GPC analysis showed that all the caprolactone and urea had reacted.

EXAMPLE 5

The following materials were charged to a reactor:

Parts by weight
Methyl caprolactone _____ 128
Urea _____ 60

The reaction mixture of methyl-caprolactone and urea was heated to 300° F. When most of the urea had dissolved (in about 2 hours) 8 drops of tetrapropyl titanate were added. The mixture was held at 300° F. for about 33 hours (the mixture was homogeneous after 3 hours at 300° F. and 1 hour after the catalyst was added).

The resultant product was a viscous resin at room temperature (Gardner-Holdt viscosity=Z9).

EXAMPLE 6

The following materials were charged to a reactor:

Parts by weight
Methyl caprolactone _____ 256
Urea _____ 60

The two components were heated to 300° F. until most of the urea had dissolved. Tetrapropyl titanate (8 drops) was then added and heating at 300° F. was maintained for about 24 hours. The resultant product has a Gardner-Holdt viscosity of Z5.

EXAMPLE 7

Under the same conditions as Example 6, 256 parts of methyl caprolactone, 12 parts of urea, and 6 drops of tetrapropyl titanate were utilized.

The resultant product had a Gardner-Holdt viscosity of Z6–Z7.

EXAMPLE 8

The following materials were charged to a reactor:

| | Parts by weight |
|---|---|
| Triamine [1] (Jeffamine T-403, Jefferson Chemical Co.) | 300 |
| Urea | 135 |

[1] The triamine used had a molecular weight of 400 and was of the following formula:

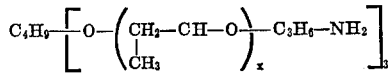

wherein $x \sim 1$.

The mixture was gradually heated to about 150° F. over a period of about 3 hours with simultaneous removal of ammonia gas. The resultant trisureido reaction product was then charged to a reactor and blended as follows:

| | Parts by weight |
|---|---|
| Reaction product | 53 |
| ε-Caprolactone | 34.2 |

The mixture was heated to make it homogeneous, and then 6 drops of tetrapropyl titanate were added. The mixture was kept at 300° F. for 24 hours.

A viscous resin was obtained, which did not flow at room temperature. GPC analysis showed that all the caprolactone had reacted.

EXAMPLE 9

The trisureido reaction product of Example 8 was blended as follows:

| | Parts by weight |
|---|---|
| Reaction product | 53 |
| ε-Caprolactone | 68.4 |

The mixture was heated at 300° F. to make it homogeneous, after which were added 6 drops of tetrapropyl titanate. The mixture was kept at 300° F. for 24 hours.

The resultant product was a waxy-solid. GPC analysis showed that all the caprolactone had reacted.

EXAMPLE 10

The trisureido reaction product of Example 8 was blended as follows:

| | Parts by weight |
|---|---|
| Reaction product | 26.5 |
| ε-Caprolactone | 171 |

The mixture was heated at 300° F. until homogenous, after which were added 8 drops of tetrapropyl titanate. The mixture was kept at 300° F. for 24 hours.

GPC analysis showed that all the caprolactone had reacted. The resultant product was characterized by a Gardner-Holdt viscosity of Z+ at 75 percent solids in methylbutyl ketone.

EXAMPLE 11

The following materials were charged to a reactor provided with a thermometer, condenser and dropping funnel:

| | Parts by weight |
|---|---|
| Ammonium hydroxide (30% solids) | 705 |
| Water | 1400 |
| Toluene | 500 |

The temperature was reduced to about 19° C. Over the next 45 minutes, a mixture of methane-bis(cyclohexyl isocyanate) and toluene (600 parts and 225 parts, respectively) was added to the reactor. After about 10 hours (average temperature ~20° C.), a white crystalline solid was formed. Water (500 milliliters) was then added. The solid was then filtered off and collected. The solids were then washed with water and filtered again. The solid was then dried at 250° F. for about 14 hours.

The product was believed to have the following formula:

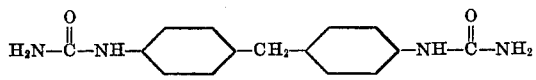

The above bisureido product was then blended in a reactor as follows:

| | Parts by weight |
|---|---|
| Bisureido | 58.8 |
| ε-Caprolactone | 45.6 |

The mixture was heated at 350° F. for about 2 hours until homogeneous. The temperature was maintained for an additional five hours, after which the temperature was held at 300° F. for 9 hours.

GPC analysis showed that all the caprolactone had reacted.

EXAMPLE 12

The bisureido compound of Example 11 was blended in a reactor as follows:

| | Parts by weight |
|---|---|
| Bisureido | 29.4 |
| ε-Caprolactone | 57 |

The mixture was heated at 350° F. for about 2 hours until homogeneous. After an additional 5 hours at 350° F., the temperature was dropped to 300° F. for 9 hours and then increased to 340° F. for 16 hours.

GPC analysis showed that less than 2 percent of the caprolactone remained unreacted.

EXAMPLE 13

The bisureido compound of Example 11 was blended in a reactor as follows:

| | Parts by weight |
|---|---|
| Bisureido | 29.4 |
| ε-Caprolactone | 114 |

The reaction conditions were identical to those of Example 12.

GPC analysis showed that less than 5 percent of the caprolactone remained unreacted.

EXAMPLE 14

The following coating composition was applied to a steel substrate by a draw bar:

| | Parts by weight |
|---|---|
| Product of Example 5 | 10 |
| Product of Example 3 | 2.5 |
| Hexakis(methoxymethyl)melamine | 4 |
| p-Toluenesulfonic acid | 0.04 |
| Methylbutyl ketone | 2 |

When heated at 300° F. for about 2 hours, a film having good properties was produced.

EXAMPLE 15

The following coating composition was applied to a steel substrate by a draw bar:

| | Parts by weight |
|---|---|
| Product of Example 6 | 10 |
| Product of Example 3 | 2.5 |
| Hexakis(methoxymethyl)melamine | 4 |
| p-Toluenesulfonic acid | 0.04 |
| Methylbutyl ketone | 2 |

After 30 minutes at 300° F., a relatively soft film resulted.

When 6 parts and 7 parts, respectively, of hexakis(methoxymethyl)melamine were substituted for the 4 parts used above, the composition was curable at 250° F. for 30 minutes and produced a hard, clear film.

EXAMPLE 16

The following coating composition was applied to a steel substrate by a draw bar:

| | Parts by weight |
|---|---|
| Product of Example 5 | 10 |
| Product of Example 3 | 2.5 |
| Melamine-formaldehyde resin (MM83, Rohm and Haas Co.) | 10 |
| p-Toluenesulfonic acid | 0.08 |
| Methylbutyl ketone | 2 |

After 30 minutes at 250° F., a very soft film resulted. When cured at 375° F. for 10 minutes, a very hard film resulted.

EXAMPLE 17

The following coating composition was applied to a steel substrate by a draw bar:

| | Parts by weight |
|---|---|
| Product of Example 5 | 10 |
| Product of Example 3 | 2.5 |
| MM83 | 6.3 |
| p-Toluenesulfonic acid | 0.03 |
| Methylbutyl ketone | 2 |

After 20 minutes at 325° F., a very hard film resulted.

EXAMPLE 18

The following coating composition was applied to a steel substrate by a draw bar:

| | Parts by weight |
|---|---|
| Product of Example 6 | 10 |
| Product of Example 3 | 2.5 |
| MM83 | 6.3 |
| Methylbutyl ketone | 2 |
| p-Toluenesulfonic acid | 0.06 |

After 30 minutes at 250° F., a clear, hard film resulted.

EXAMPLE 19

The following coating composition was applied to a steel substrate by a draw bar:

| | Parts by weight |
|---|---|
| Product of Example 12 | 10 |
| Product of Example 3 | 2.5 |
| MM83 | 6.3 |
| p-Toluenesulfonic acid | 0.03 |
| Methylbutyl ketone | 2 |

After 30 minutes at 250° F., a clear hard film resulted.

EXAMPLE 20

The following materials were charged to a reactor:

| | Parts by weight |
|---|---|
| Urea | 180 |
| ε-Caprolactone | 3390 |
| Tetrapropyl titanate | 0.75 |

The mixture was heated at 140° C. for about 10 hours.

Utilizing the above-formed urea caprolactone adduct, the following materials were charged to a reactor under a nitrogen atmosphere and were heated to about 110° C. for 1 hour:

| | Parts by weight |
|---|---|
| Urea-caprolactone adduct | 585 |
| Poly (1,6-hexanediol adipate) (mol. wt. ~1000) | 588 |
| Methane-bis(cyclohexyl isocyanate) | 500 |
| Methyl butyl ketone | 650 |
| Dibutyltin dilaurate | 0.02 |

There were then added the following materials:

| | Parts by weight |
|---|---|
| Triethylenediamine | 9.5 |
| Methyl isobutylketone | 400 |
| Methylbutyl ketone | 800 |
| Trimethylol propane | 90 |
| Dimethylol propionic acid | 70 |
| 2,2 - dimethyl - 3 - hydroxypropyl - 2,2 - dimethyl-3-hydroxypropionate | 102 |

The mixture was heated at 100° C. for about 5 hours, after which were added 66 parts of a polycaprolactone triol (mol. wt. ~300) and 8 parts of monoethanol amine. Heating at 100° C. was continued for another hour. In order to insure that all the isocyanate groups had reacted, 175 parts of n-butanol were added. The temperature was held at 100° C. for an additional 50 minutes, after which time, 24.6 parts of hydroxyethylethylene imine were added. The temperature was maintained at 100° C. for another hour, after which time 525 parts of isopropyl alcohol were added. The mixture was then allowed to cool. The resultant polyurethane had an acid value of about 3, a percent solids (at 150° C.) of about 46, and a Gardner-Holdt viscosity of X+.

The above polyurethane polyol was then combined with 25 percent by weight of butylated melamine formaldehyde resin and 0.2 percent by weight of p-toluenesulfonic acid. The composition was then applied to a steel substrate and was cured at 250° F. for 30 minutes. The cured film had excellent elongation with good hardness and tensile strength.

In a similar manner, reaction products of desirable properties are produced using other polyureido compounds of the class described, as well as other lactones in place of the specific materials shown in the examples.

According to the provisions in the paent statutes, there are described above the invention and what are now considered to be its best embodiments. However, within the scope of the appended claims, it is to be understood that the invention can be practiced otherwise than as specifically described.

What is claimed is:

1. A composition comprising the reaction product of:
(A) a lactone of the formula:

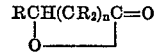

wherein $n$ is an integer of from four to six, wherein at least $n+2$ groups represented by R are hydrogen, and wherein the remaining R groups are of the group consisting of hydrogen, alkyl, cycloalkyl, alkoxy, and single ring aromatic hydrocarbon radicals, and
(B) a compound of the formula:

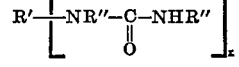

wherein R'' is selected from the group consisting of hydrogen or lower alkyl of from 1 to 4 carbon atoms, wherein $x$ is an integer of from one to three, wherein R' is selected from the group consisting of a monovalent organic radical and hydrogen when $x$ is one, wherein R' is a divalent organic radical when $x$ is two, and wherein R' is a trivalent organic radical when $x$ is three.

2. The composition of Claim 1, wherein the molar ratio of component (A) to component (B) is at least 1:1.

3. The composition of Claim 2, wherein $n$ is four and $x$ is one.

4. The composition of Claim 3, wherein all the R's of component (A) are hydrogen.

5. The composition of Claim 4, wherein R'' is hydrogen and wherein R' is hydrogen.

6. The composition of Claim 5, wherein the molar ratio of component (A) to component (B) is 4:1.

7. The composition of Claim 5, wherein the molar ratio of component (A) to component (B) is 10:1.

8. A method of preparing a lactone reaction product comprising:
(A) blending:
(1) a lactone of the formula:

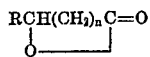

wherein $n$ is an integer of from 4 to 6, wherein at least $n+2$ R's are hydrogen, and wherein the remaining R's are of the groups consisting of hydrogen, alkyl, cycloalkyl, alkoxy, and single ring aromatic hydrocarbon radicals, with
(2) a compound of the formula:

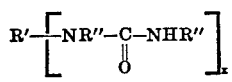

wherein R" is selected from the group consisting of hydrogen and lower alkyl of from 1 to 4 carbon atoms, wherein $x$ is an integer of from one to three, wherein R' is selected from the group consisting of a monovalent organic radical and hydrogen, when $x$ is one, wherein R' is a divalent organic radical when $x$ is two, and wherein R' is a trivalent organic radical when $x$ is three; and
(B) heating the blend to at least about 100° C.

9. The method of Claim 8 wherein the molar ratio of component (1) to component (2) is at least 1:1.

10. The method of Claim 9 wherein $n$ is four and $x$ is one.

11. The method of Claim 10 wherein all the R's of component (1) are hydrogen.

References Cited
UNITED STATES PATENTS 3,169,945    2/1965    Hostettler el al. ___ 260—78.3 R MAURICE J. WELSH, JR., Primary Examiner U.S. Cl. X.R.

260—78.3 R